United States Patent [19]

Coiro, Sr. et al.

[11] Patent Number: 5,400,744
[45] Date of Patent: Mar. 28, 1995

[54] LEAKPROOF LOCKING STERILE WATER VALVE SYSTEM

[75] Inventors: Michael A. Coiro, Sr., Jacobstown; Dale R. Murray, Burlington Township, Burlington County; Frank J. Herdt, Chesterfield, all of N.J.

[73] Assignee: Allentown Caging Co., Inc., Allentown, N.J.

[21] Appl. No.: 228,738

[22] Filed: Apr. 18, 1994

[51] Int. Cl.⁶ .......................... A01K 1/00; A01K 7/00
[52] U.S. Cl. ....................................... 119/72.5; 119/18
[58] Field of Search ........................... 119/18, 72.5, 75

[56] References Cited

U.S. PATENT DOCUMENTS

| | | | |
|---|---|---|---|
| 3,958,535 | 5/1976 | Salvia | 119/72.5 |
| 3,965,864 | 6/1976 | Beltz . | |
| 4,284,036 | 8/1981 | Hostetler . | |
| 4,343,261 | 8/1982 | Thomas . | |
| 4,365,590 | 12/1982 | Ruggieri et al. . | |
| 4,402,280 | 9/1983 | Thomas . | |
| 4,444,149 | 4/1984 | Shomer | 119/18 |
| 4,458,632 | 7/1984 | Niki . | |
| 4,699,088 | 10/1987 | Murray . | |
| 4,881,569 | 11/1989 | Fournier . | |
| 4,989,545 | 2/1991 | Sheaffer . | |
| 5,000,120 | 3/1991 | Coiro, Sr. et al. . | |
| 5,003,922 | 4/1991 | Niki et al. . | |
| 5,042,429 | 8/1991 | Deitrich . | |
| 5,048,459 | 9/1991 | Niki . | |
| 5,301,635 | 4/1994 | Badia et al. | 119/72.5 |

FOREIGN PATENT DOCUMENTS 2305126 3/1975 France .
863962 1/1960 United Kingdom .

*Primary Examiner*—Paul J. Hirsch
*Attorney, Agent, or Firm*—Mathews, Woodbridge & Collins

[57] ABSTRACT

A locking sterile water valve system releasably couples a sterile water valve to a cage. The water valve is releasably coupled to an outside water supply while maintaining a barrier condition. A locking member is attached to the animal cage. A raised portion of the locking member is received in a recessed portion of the sterile water valve assembly. The water valve can be rotated for snapping the water valve into locking engagement with the locking member connecting the water valve assembly to the cage. An internal cup can be used with the water valve for collecting water leaking from the valve to prevent water from leaking into the cage and jeopardizing the animals and maintaining barrier condition.

17 Claims, 2 Drawing Sheets

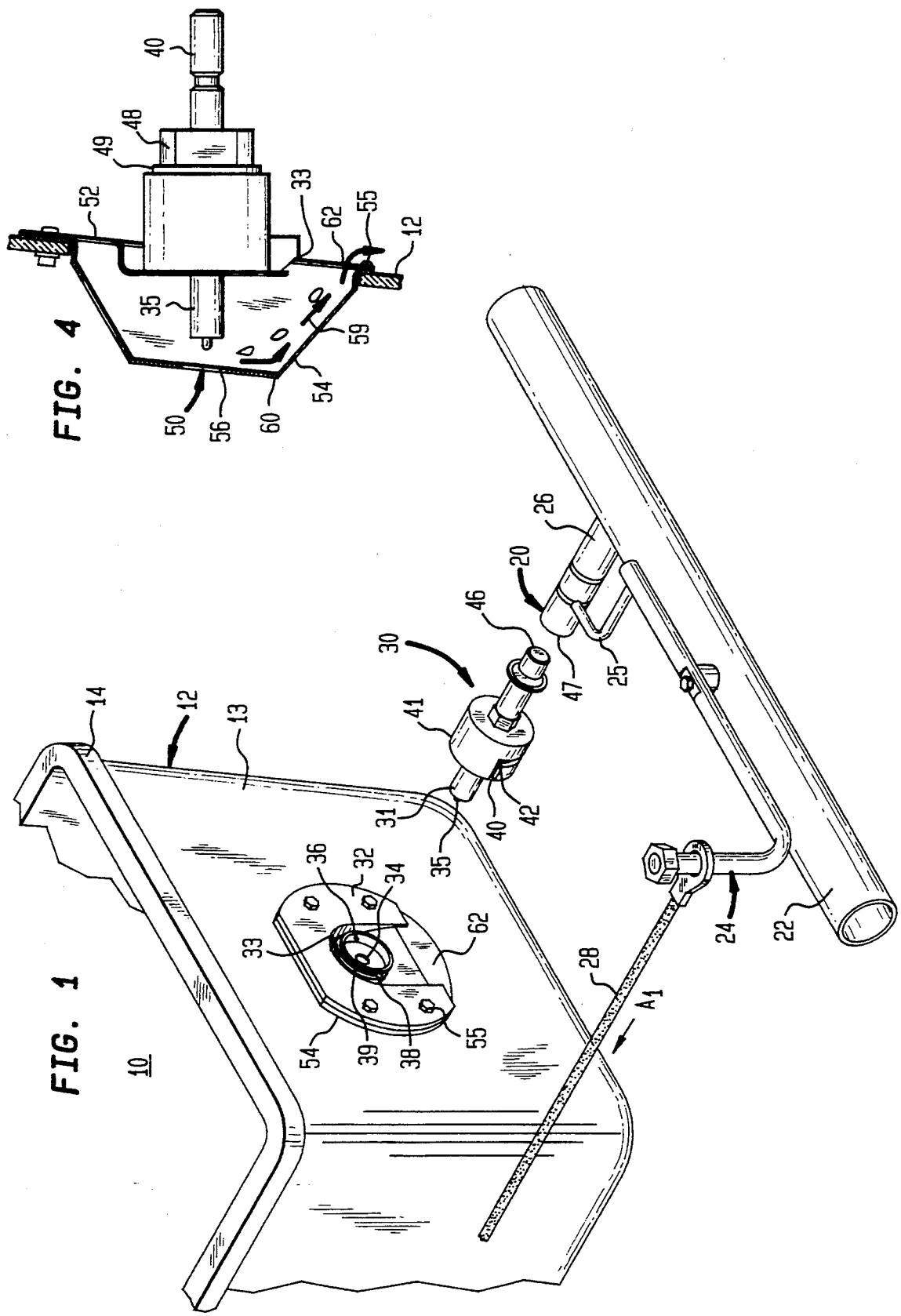

5,400,744

LEAKPROOF LOCKING STERILE WATER VALVE SYSTEM

BACKGROUND OF THE INVENTION

1. Field of the Invention

This invention relates to an isolated animal caging system in which a lockable removable internal sterile water valve is prevented from leaking into the animal cage.

2. Description of the Related Art

Watering devices for supplying water from an outside watering system to an animal confined in a cage are known in the art. U.S. Pat. No. 4,699,088 issued to the same inventors of this disclosure describes a cage assembly including a water manifold for allowing confined animals to be supplied with water from an outside watering system. The cages can be positioned on a rack. A watering valve is inserted into the water aperture through a pliable, flexible entrance which seals the cage when the cage assembly is disconnected from the outside watering source. However, this cage assembly has the disadvantage that the watering valve does not stay with the cage when the cage is removed from the rack. Accordingly, the watering valve must be sterilized each time it is inserted into a cage in order to maintain a sterile cage condition.

U.S. Pat. No. 4,365,590 relates to an animal cage and rack system in which each cage is stored adjacent to an outside water valve. The animal has access to the valve through an aperture in the cage. A v-shaped trough positioned on the outside of the cage below the valve collects excess dripping water from the valve. This watering system has the disadvantage that the valve is positioned outside the cage and cannot be assured of a sterile valve condition to the animal.

U.S. Pat. No. 5,042,429 describes a drinking valve fastened within a cage to allow an animal to consume liquid from an outside liquid manifold. A friction fit coupling allows the internal drinking valve to be connected and removed from the liquid manifold when the cage is respectively inserted or removed from a rack. The drinking valve remains with the cage when the cage is removed from the water manifold for maintaining a barrier condition and allowing sterilization of the valve within the cage. Progressive wear of the valve or a malfunction can cause the valve to leak into the cage. The leaking of the valve can cause wetting of the bedding in the cage. If the water valve continues to leak, the cage can fill up with water resulting in serious harm or death to the confined test animal.

U.S. Pat. No. 4,284,036 describes a watering system for fowl and small animals including a water valve which engages two spaced valve seats. The valve seats are unseated by movement laterally and upwardly of a pin extending through a discharge opening to ensure effective sealing of the valve. However, wear of the valve seats can result in water leaking into the cage.

Of possible general relevance are U.S. Pat. No. 4,881,569 related to a coupling for a drinking water supply and U.S. Pat. No. 4,458,632 related to a water dispenser for small animals.

SUMMARY OF THE INVENTION

Briefly described the present invention comprises a sterile water valve system which can be locked to a cage and allowing the cage valve to be connected and disconnected from an outside watering system. Cages with an internal drinking valve can be inserted and removed from the outside water supply system while maintaining a barrier condition within the cage. A water valve can be easily removed from the cage to allow the valve to be sterilized and the cages to be stacked during the cage cleaning and sterilization process. A leakproof system prevents water from leaking from the water valve into the animal's cage which would jeopardize the animal's safety.

A locking member is coupled to the cage. The locking member includes an aperture which is positioned over an opening in the cage wall. The sterile water valve is inserted through the aperture into the cage under a sterile cage changing station. The locking member also includes a spring ring with spring wire ends protruding inside a collar. The pair of spring wire ends are received in a pair of recessed channel portions of the water valve assembly. Upon rotating the water valve assembly in the locking member, the water valve is locked to the locking member. The water valve is rotated in the opposite direction for allowing the water valve to disengage the locking member and be removed from the cage. The removal of the water valve provides for stackability of caging during cage washing cycles, and sterilization of the water valve.

Preferably, the water valve is releasably coupled to the outside watering system with a positive quick disconnect assembly. The positive quick disconnect assembly allows the cage to be quickly and easily disconnected from the water supply while automatically closing the water supply. The water valve remains with the cage after disconnection from the water supply to maintain barrier conditions within the cage.

A leakproof system includes an internal cup attached to the animal cage. Preferably, the locking member is permanently attached to the back plate of the internal cup. An outlet is permanently attached to the lower portion of the back plate. The internal cup includes a cavity for receiving the water valve. Water which drips from a malfunctioning water valve flows along the inside surface of the cavity and exits the cage through the outlet.

These and other features of the invention can be further understood with reference to the following drawings.

BRIEF DESCRIPTION OF THE DRAWINGS

FIG. 1 is a perspective view of the cage assembly and locking water valve system of the present invention.

FIG. 4 is a cross-sectional view of a leak proof system used with the water valve system shown in FIG. 1.

DETAILED DESCRIPTION OF THE INVENTION

Figure 3:
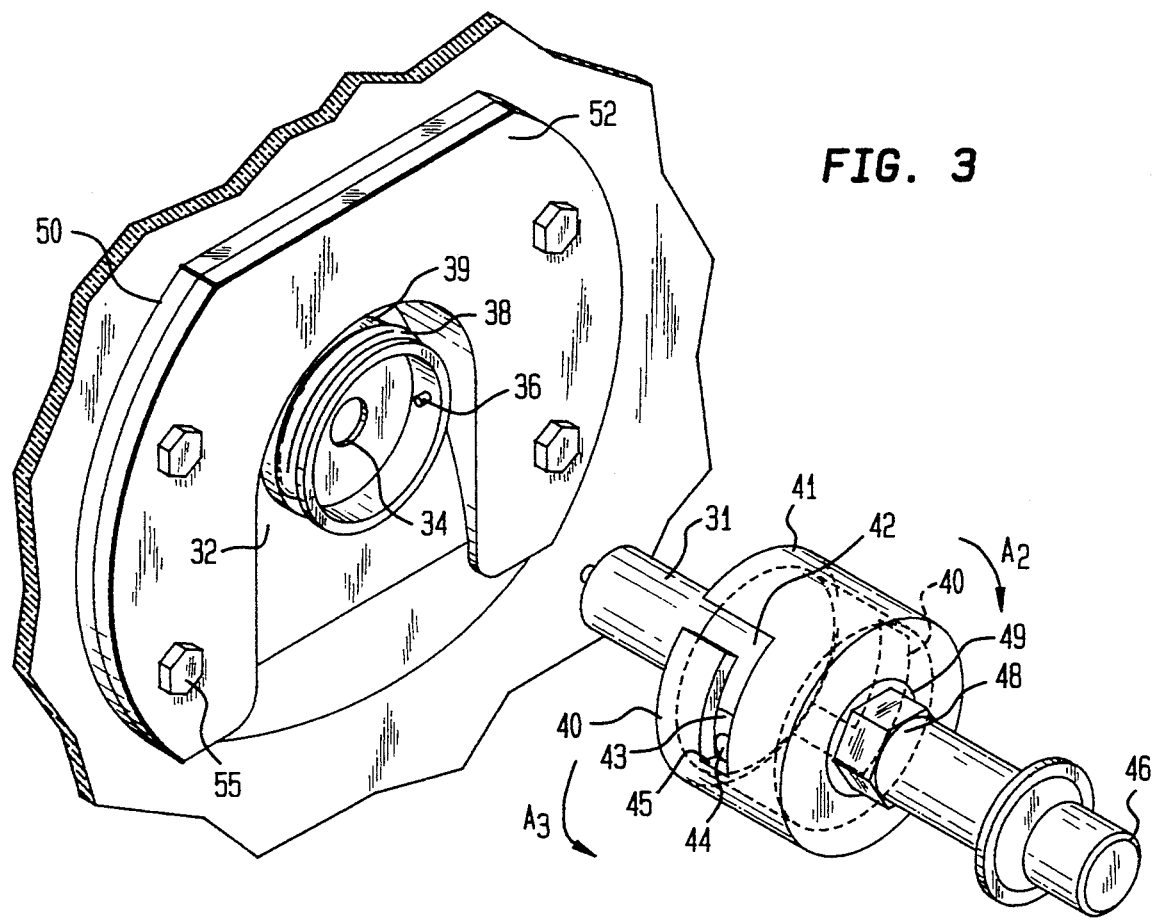
FIG. 3 is a perspective view of the water valve and locking member of the present invention.

During the course of this description like numbers will be used to identify like elements according to the different figures which illustrate the invention.

FIG. 1 is a perspective view of cage system 10 including locking water valve system 30 in accordance with the teachings of the present invention. Cage 12 includes walls 13. Walls 13 support top 14 at the periphery thereof. Cage 12 is generally similar to those described in U.S. Pat. Nos. 5,006,102 and 5,148,766, hereby incorporated by reference into this application.

Fresh water is supplied to cage 12 through an outside water supply connection 20. Water supply manifold 22 can supply multiple animal cages. Multiple water supply connections 20 can be located on water manifold 22. Preferably, a quick disconnect linkage assembly 24 is used to disengage cage 12 from water supply connection 20. Quick disconnect linkage assembly 24 includes water manifold connection 25 and release member 28. Water line extension 26 is connected to water manifold 22. Release member is pulled away from cage 12 in the direction of arrow $A_1$ to rotate manifold connection 25 an disengage cage 12 from supply manifold connection 20. In the alternative, a friction fit quick disconnect assembly can be used for disconnecting cages from the water manifold.

Locking water valve system 30 includes water valve assembly 31 and locking member 32. Locking member 32 is attached assembly 31 and locking member 32. Locking member 32 is attached to wall 13 of cage 12. Locking member 32 is positioned over an opening 33 in wall 13. Locking member 32 includes an aperture 34 for receiving end 35 of water valve assembly 31. During coupling of water valve assembly 31 to cage 12, end 35 of water valve assembly 31 is inserted through aperture 34 and opening 33 into cage 12.

Male quick disconnect end 46 of water valve assembly 31 is inserted into female quick disconnect end 47 of water supply connection 20 during coupling of cage 12 with water valve assembly 31 to water manifold 22. Water valve assembly 31 remains with cage 12 after disconnection of cage 12 from water manifold 22 with quick disconnect assembly 24. After cage 12 is disconnected from water manifold 22, water valve assembly 31 remains coupled to cage 12 and maintains the cage in a barrier condition.

Figure 2:
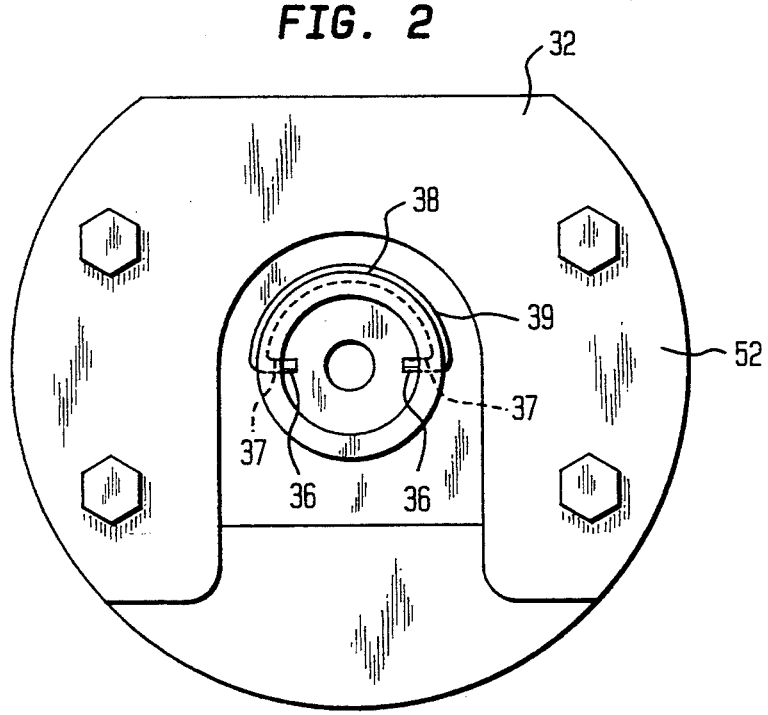
FIG. 2 is a front plan view of the locking member of the present invention.

FIG. 2 illustrates a front plan view of locking member 32. A pair of spring wire ends 36 extend through respective aperture 37 in collar 38. A C-shaped spring wire 39 includes spring wire ends 36. C-shaped spring wire 39 is biased against the outside surface of collar 38. Collar 38 is permanently attached to backplate 52.

FIG. 3 is a perspective view of the insertion of water valve assembly 31 into locking member 32. An entry recessed channel 40 is formed in either outside side surface of housing 41 of water valve assembly 31, as shown on the other side of the housing in phantom. A L-shaped recessed channel 42 engages entry recessed channel 40. A depression 43 and hole 44 are formed at end of 45 of L-shaped recessed channel 42. Spring wire end 36 is received in entry recessed channel 40 of water valve assembly 31. Spring wire end 36 slides into L-shaped recessed channel 42. Water valve assembly 31 is rotated in a clockwise direction, shown by Arrow $A_2$, to move spring wire end 36 over depression 43 into hole 44. Rotation of water valve assembly 31, snaps spring wire end 36 into hole 44. Similarly, spring wire end 36 is also received in hole 44 shown in phantom for the other side of the valve. After spring wire end 36 is received in hole 44, water valve assembly 31 is locked to cage 12.

Preferably, water valve assembly 31 is sterilized before being inserted into aperture 34 for providing a sterile environment inside cage 12. It will be appreciated that spring wire end 36 can have a different shape which is compatible with a corresponding shaped hole in the L-shaped recessed channel of the water valve.

Water valve assembly 31 can be disconnected from cage 12 by rotating water valve assembly 31 in a counter clockwise direction, as shown by arrow $A_3$. During disconnection of water valve assembly 31, spring wire end 36 moves from hole 44 over depression 43 into L-shaped recessed channel 42. After spring wire end 36 is rotated to entry recessed channel 40, pulling water valve assembly 31 away from cage 12 disengages water valve assembly 31 from cage 12. Water valve assembly 31 can include nut 48 for assembling housing 41 to water valve assembly 31. Silicone bushing 49 is positioned under nut 48 to provide flexibility for allowing radial movement of water valve assembly 31 during connection and disconnection of cage 12 from water manifold 22.

After disconnection of cage 12 from water supply connection 20 with quick disconnect assembly 24 and disengagement of water valve assembly 31 from locking member 32 under a sterile changing station then soiled, cages 12 can be stacked one on top of the other. For example cages 12 can be stacked while being transported to a washroom where the cages are cleaned. After disconnection of water valve assembly 31 from locking member 32, water valve assembly 31 can be sterilized for later insertion into another cage 12 inside the sterile cage changing station.

FIG. 4 illustrates leakproof system 50 for preventing leaking of water from water valve assembly 31 into cage 12. Leakproof system 50 includes back plate 52 and internal cup 54. Back plate 52 is attached to internal cup 54. Internal cup 54 is inserted through opening 33 in wall 13. Machine bolts 55 or screws can be used to attach back plate 52 and internal cup 54 to cage 12.

Internal cup 54 has an opening 56 formed therein to permit access to end 35 of water valve assembly 31 by an animal in cage 12. Water 59 which drips from water valve assembly 31 due to spillage or a faulty valve flows along inner surface 60 of internal cup 54 and exits internal cup 54 through outlet 62 in back plate 52. Outlet 62 can be of a predetermined size to prevent air borne contaminants from entering cage 12 when cage 12 is in static condition or connected to an air supply system, as described in U.S. Pat. No. 5,002,102.

The present invention has the advantage of providing a sterile leakproof water valve system positioned inside a cage which can be quickly disconnected from a water supply system. The sterile water valve assembly can be locked into place on the cage under the sterile cage changing station and remain with the cage when the cage is connected and removed from the water supply system. The water valve assembly can be easily removed from the cage during cage changing by turning and pulling outward on the valve assembly. The removal of the water valve assembly from the cage allows the water valve assembly to be sterilized and allows the cages to be stacked during the cleaning process without protruding water valves. An internal cup catches water dripping from the water valve and dispenses the collected water outside the cage, thereby subjecting the caged animals to cage flooding. The cage and water valve are in an isolated environment free from air borne contaminants.

While the invention has been described with reference to the preferred embodiment, this description is not intended to be limiting. It will be appreciated by those of ordinary skill in the art that modifications may be made without departing from the spirit and scope of the invention.

We claim:

1. A sterile water valve system for an animal cage, said cage including at least one wall, said system comprising:
   sterile water valve means for supplying water to said cage, said sterile water valve means removably connected to a water supply; and
   a locking member removably coupled to said sterile water valve means, said locking member being attached to said cage,
   wherein said sterile water valve means can be disconnected from said water supply and remain with said cage for maintaining a barrier condition in said cage and thereafter said sterile water valve means can be disconnected from said cage for stackability of said cage during cage washing and sterilization.

2. The water valve system of claim 1 wherein said water valve means comprises:
   a water valve;
   a housing surrounding a portion of said water valve.

3. The water valve system of claim 2 wherein said housing includes at least one recessed channel portion and said locking member includes at least one raised portion, said raised portion of said locking member being received in said recessed channel portion of said housing.

4. The water valve system of claim 3 wherein said recessed portion comprises a first recessed channel portion coupled to a second recessed channel portion, said second recessed channel having an L-shape, said raised portion being inserted in said first recessed channel portion and rotated into said second recessed channel portion for locking said water valve means to said cage.

5. The water valve system of claim 4 wherein said raised portion is rotated from said second recessed channel portion to said first recessed channel portion for unlocking said water valve means from said cage.

6. The water valve system of claim 5 wherein said water valve means is removably connected to said water supply with a positive quick disconnect assembly.

7. The water valve system of claim 6 wherein said locking member has an aperture therein and said cage wall has an opening therein, said aperture of said locking member being positioned over said opening, and said aperture receiving said water valve.

8. A sterile water valve system for an animal cage, said cage including at least one wall, said system comprising:
   a water valve for supplying water to said cage, said water valve being removably connected to a water supply with a positive quick disconnect assembly;
   a locking member attached to said cage removably coupled to said water valve, said locking member having an aperture therein and said cage wall has an opening therein, said aperture of said locking member being positioned over said opening, said aperture receiving said water valve;
   a housing surrounding a portion of said water valve, said housing includes a first recessed channel portion coupled to a second recessed channel portion, said second recessed channel portion having an L-shape, said locking member includes at least one raised portion, said raised portion being inserted in said first recessed channel portion and rotated into said second recessed channel portion for locking said water valve to said cage, said raised portion being rotated from said second recessed channel portion to said first recessed channel portion for unlocking said water valve means from said cage; and
   an internal cup, said cup having a front end and a rear end, said internal cup having a slot at said rear end, said front end of said cup being attached to said cage, said water valve being received within said internal cup and positioned adjacent said slot; and
   an outlet in the front end of said cup,
   wherein water which drips from said water valve exits said cup through said outlet.

9. The water valve system of claim 18 wherein said locking member has a backplate with said aperture therein, said backplate being coupled to said front end of said cup.

10. The water valve system of claim 9 in which said cup has a cavity positioned between said front and said rear end, said water valve means being received in said cavity and said cavity having an inner surface,
    wherein said water drips from said water valve to said inner surface of said cup to said outlet end to outside of said cage.

11. The water valve system of claim 10 wherein said raised portion of said locking member is an end of a spring wire.

12. The water valve system of claim 11 wherein said locking member includes a pair of said ends of said spring wire.

13. The water valve system of claim 12 wherein said locking member has a collar, a c-shaped spring wire between said ends of said spring wire protruding through an aperture in said collar,
    wherein said c-shaped spring wire is biased to said collar.

14. The water system of claim 13 wherein said housing includes a pair of said first and second recessed portions, each of said recessed channel portions having a depression and a hole, respective one of said spring wire ends being snapped into a respective one of said holes for locking said water means to said cage.

15. The water system of claim 14 wherein said water means further comprises:
    nut means for attaching said housing to said water, said nut means being positioned on the outside surface of said water.

16. The water system of claim 15 further comprising:
    a water line connector connected to said water manifold, said water line connector having a female quick disconnect end.

17. The water system of claim 16 wherein said water means has a male quick disconnect end, said male end of said water means being received in said female quick disconnect end of said water line connector.

* * * * *